July 13, 1937. B. H. SMITH 2,086,826
MOLE TRAP
Filed Sept. 5, 1936
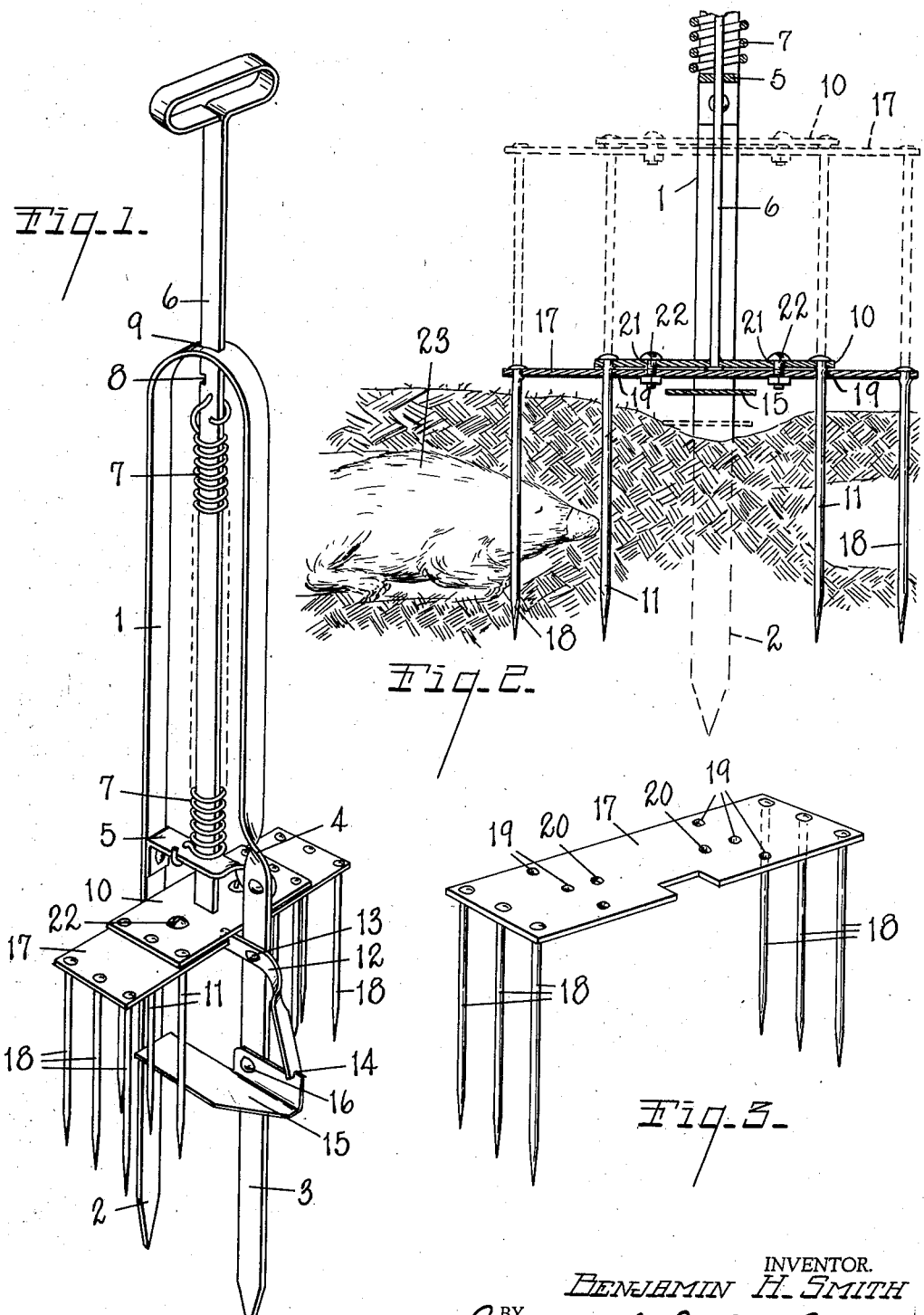
INVENTOR.
BENJAMIN H. SMITH
BY Chappell, Earl & Chappell
ATTORNEYS Patented July 13, 1937

2,086,826

UNITED STATES PATENT OFFICE 2,086,826

MOLE TRAP

Benjamin H. Smith, Niles, Mich., assignor to Michigan Wire Goods Company, Niles, Mich.

Application September 5, 1936, Serial No. 99,595

5 Claims. (Cl. 43—79)

The main objects of this invention are:

First, to provide a mole trap which is well adapted for use in various soils and soil conditions.

Second, to provide a mole trap which is highly efficient when used in various soils and soil conditions.

Objects relating to details and economies of the invention will appear from the description to follow. The invention is defined and pointed out in the claims.

A structure which is a preferred embodiment of the invention is illustrated in the accompanying drawing, in which:

Fig. 1 is a perspective view of a mole trap embodying the features of my invention with the parts in "set" position.

Fig. 2 is a fragmentary section illustrating the trap in relation to the ground, the parts being shown by full lines in actuated position and in set or retracted position by dotted lines.

Fig. 3 is a perspective view of the auxiliary prong plate removed from the trap.

In the accompanying drawing, the frame 1 is preferably formed of a flat strip of metal bent to a U-shape, the arms of the frame constituting ground engaging spuds 2 and 3. One arm is given a quarter twist at 4 so that the spud 3 is presented in convenient position for attaching the tripping pan and detent thereto.

A cross piece 5 connects the arms. This cross piece and the bight portion of the frame are slotted to receive and reciprocatingly support the plunger 6.

The coiled spring 7 is arranged about the plunger to be connected at its upper end to the plunger below the bight or top of the frame and to the cross piece 5 so that when the plunger is in retracted position the spring is placed under stress.

The plunger is provided with a notch 8 engageable with the edge of the opening 9 in the top of the frame to facilitate setting of the trap. To the lower end of the plunger, I secure the main prong plate 10, this being secured by riveting or upsetting or soldering. This plate carries a plurality of spike-like prongs 11 at each end, there being three in the embodiment illustrated.

The trap is held in its set position by means of the detent or trigger 12 which is pivoted at 13 to one arm of the frame and is held in its engaged position by the catch 14 on the trip pan 15 which is pivoted at 16 to the frame.

I provide an auxiliary prong plate 17 which is preferably of the same width as the main prong plate but of sufficient length that it projects at each end beyond the main prong plate. This auxiliary prong plate carries a plurality of prongs 18 at each end and has holes 19 receiving the prongs 11 and has holes 20 registering or aligned with the hole 21 in the main prong plate so that bolts 22 may be passed through these registering holes for detachably securing the auxiliary plate to the main plate. This results not only in increasing the number of prongs but in spacing the prongs substantially further from the tripping pan.

It will be understood in practice that the traps are set so that when the mole traverses the previously formed runway, the soil is lifted against the trap and the trigger or detent is released, allowing the spring to project the prongs into the soil and impale the mole as is conventionally illustrated at 23.

In certain soil conditions or in certain seasons of the year when the ground is damp or very wet, the trap is tripped before the mole gets under the tines or prongs of the main prong plate. In other conditions, for example in sandy soil, the tripping pan is not actuated until the mole gets well under the plate. There is also sod, clay, and other conditions which render the supplemental plate very desirable and clearly increases the efficiency of the trap. A long prong plate is not, however, provided or desirable for all conditions. Therefore, by providing the combination of the main and auxiliary supplemental prong plates, I am enabled to effectively meet a wide variety of conditions. The prongs of the main plate serve as a positioning and supporting means for the auxiliary plate so that it is effectively supported in position by the simple expedient of a pair of stove bolts, as illustrated.

My improved trap is not only highly efficient but it is also simple and economical and very durable in its parts.

Having thus described my invention, what I claim as new and desire to secure by Letters Patent, is:

1. In a mole trap, the combination with a U-shaped frame, the lower ends of the arms constituting ground engaging spuds, of a spring actuated plunger mounted on said frame, a main prong plate fixedly secured to the lower end of said plunger and provided with a plurality of downwardly projecting prongs at each end thereof, a pivoted detent coacting with said main prong plate, a trip pan for coaction with said detent for holding the trap in set position, and an auxiliary prong plate having a plurality of depending prongs at each end disposed against the underside of said main prong plate and projecting beyond the ends thereof and perforated to receive the prongs thereof, said prong plates having aligned perforations receiving bolts whereby the auxiliary prong plate is detachably secured, the prongs of said main prong plate coacting with the bolts to position and support the auxiliary prong plate.

2. In a mole trap, the combination with a U-shaped frame, the lower ends of the arms constituting ground engaging spuds, of a spring actuated plunger mounted on said frame, a main prong plate fixedly secured to the lower end of said plunger and provided with a plurality of downwardly projecting prongs at each end thereof, a pivoted detent coacting with said main prong plate, a trip pan for coaction with said detent for holding the trap in set position, an auxiliary prong plate having a plurality of depending prongs at each end disposed against the underside of said main prong plate and projecting beyond the ends thereof and perforated to receive the prongs thereof, and means for detachably securing the auxiliary prong plate to the main prong plate, the prongs of said main prong plate coacting with the said securing means to position and support the auxiliary prong plate.

3. In a mole trap, the combination with a frame provided with ground engaging spuds, of a spring actuated plunger mounted on said frame, a main prong plate fixedly secured to said plunger and provided with a plurality of downwardly projecting prongs at each end thereof, a trip pan operatively associated with said prong plate, and an auxiliary prong plate having a plurality of depending prongs at each end disposed below and projecting beyond the ends of said main prong plate and perforated to receive the prongs thereof, said prong plates having aligned perforations receiving bolts whereby the auxiliary prong plate is detachably secured, the prongs of said main prong plate coacting with the bolts to position and support the auxiliary prong plate.

4. In a mole trap, the combination with a frame provided with ground engaging spuds, of a spring actuated plunger mounted on said frame, a main prong plate fixedly secured to said plunger and provided with a plurality of downwardly projecting prongs at each end thereof, a trip pan operatively associated with said prong plate, an auxiliary prong plate having a plurality of depending prongs at each end disposed below and projecting beyond the ends of said main prong plate and perforated to receive the prongs thereof, and means for detachably securing the auxiliary prong plate to the main prong plate, the prongs of said main prong plate coacting with the said securing means to position and support the auxiliary prong plate.

5. In a mole trap, the combination with a frame provided with ground engaging spuds, of a spring actuated plunger mounted on said frame, a main prong plate fixedly secured to said plunger and provided with a plurality of downwardly projecting prongs at each end thereof, a trip pan operatively associated with said prong plate, and an auxiliary prong plate having a plurality of depending prongs at each end disposed below and projecting beyond the ends of said main prong plate and perforated to receive the prongs thereof, the prongs of said main prong plate constituting means to position and support the auxiliary prong plate.

BENJAMIN H. SMITH.